United States Patent [19]

MacKay et al.

[11] 4,339,940
[45] Jul. 20, 1982

[54] MULTIPART DIE FOR ATTACHMENT OF A METAL CLIP

[75] Inventors: Frederic M. MacKay; Gordon R. Winders, both of Raleigh; Thomas E. Whittlesey, Apex, all of N.C.

[73] Assignee: Tipper Tie, Inc., Apex, N.C.

[21] Appl. No.: 156,762

[22] Filed: Jun. 5, 1980

[51] Int. Cl.³ .................. B21D 7/00; B21D 37/10
[52] U.S. Cl. .................. 72/402; 29/243.56; 72/416; 72/452
[58] Field of Search .......... 72/402, 452, 416, 410, 72/409; 29/243.56, 243.57

[56] References Cited

U.S. PATENT DOCUMENTS

| | | | |
|---|---|---|---|
| 2,969,545 | 1/1961 | Allen | 29/243.56 |
| 3,166,827 | 1/1965 | Bushi | 72/402 |
| 3,792,603 | 2/1974 | Orain | 72/402 |
| 3,793,688 | 2/1974 | Keating | 29/243.57 |
| 3,893,327 | 7/1975 | Fedorov | 72/402 |
| 3,940,841 | 3/1976 | Velarde | 29/243.56 |
| 4,043,011 | 8/1977 | Giraudi | 29/243.57 |

FOREIGN PATENT DOCUMENTS 526978 8/1976 U.S.S.R. .................. 72/402

*Primary Examiner*—Gene Crosby
*Attorney, Agent, or Firm*—Allegretti, Newitt, Witcoff & McAndrews

[57] ABSTRACT

A three part die forms a metal clip into a fixed diameter, circular configuration about a workpiece. The die is comprised of three separate die members which move radially toward and away from a fixed center point that defines the center of a first circle. A die engaging groove or channel is defined in the surface of each die member for cooperation with the metal clip. When the die is closed, the die channel defines a second circle which is concentric to the first circle.

5 Claims, 8 Drawing Figures

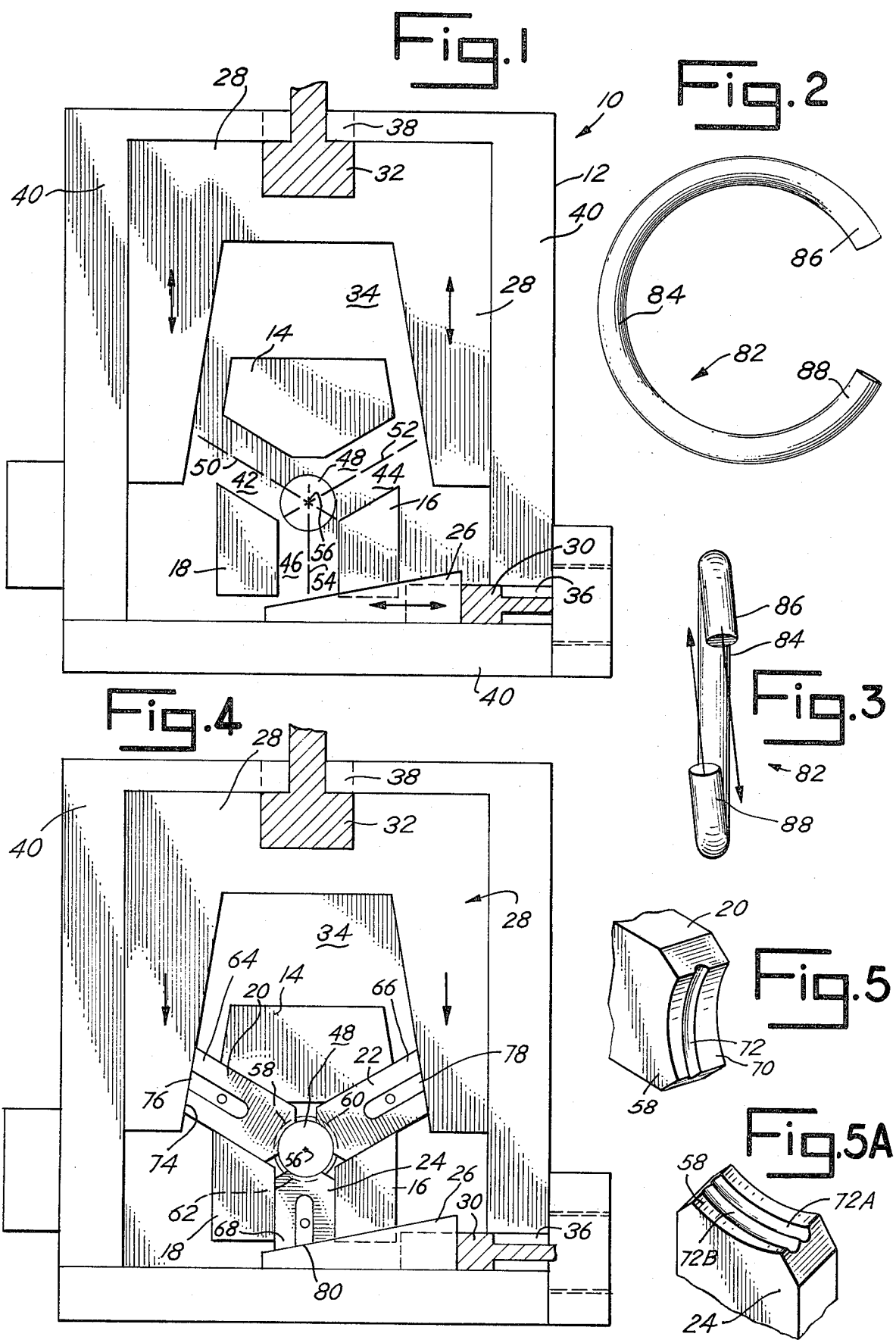

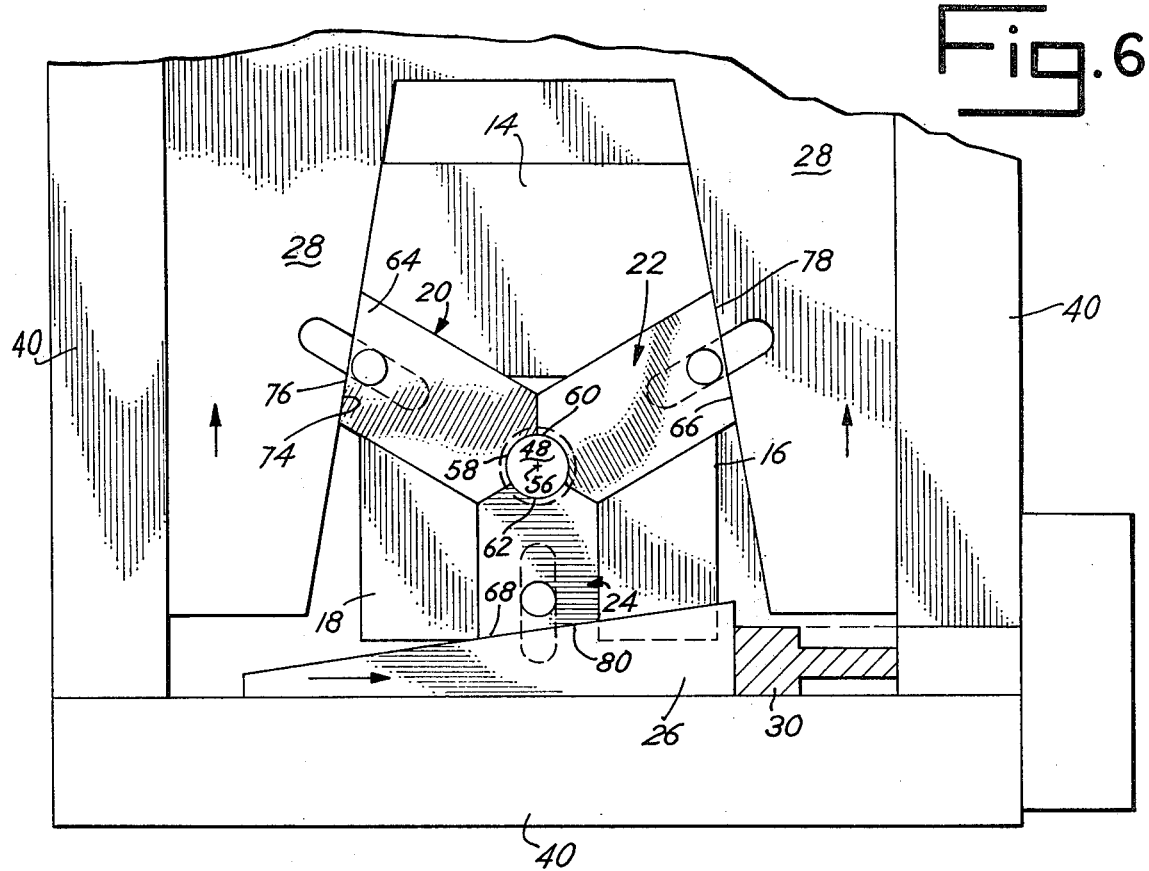
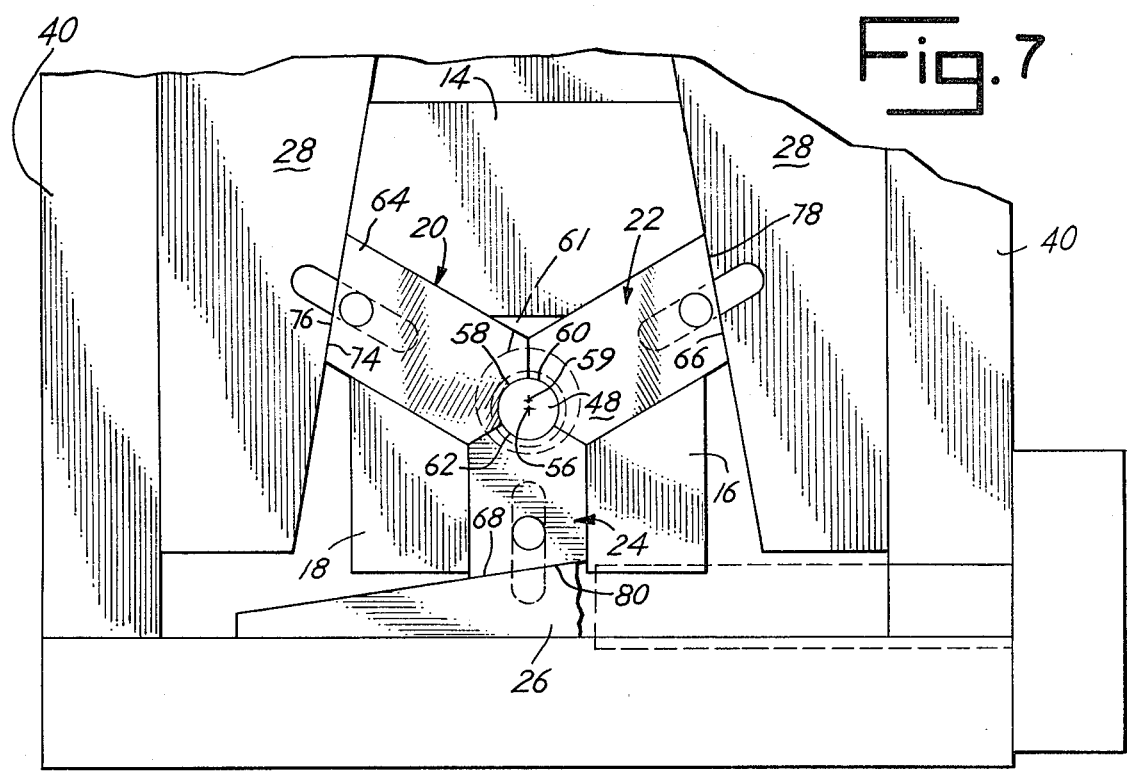

MULTIPART DIE FOR ATTACHMENT OF A METAL CLIP

BACKGROUND OF THE INVENTION

In a principal aspect, the present invention relates to a multipart die for forming a metal clip into a substantially fixed diameter, helical configuration on a workpiece.

Velarde, in a pending patent application, Ser. No. 101,171, filed Dec. 7, 1979, discloses an improved multipart die assembly for forming a closed, helical clip. This die assembly is utilized to affix a metal clip about a workpiece so that the metal clip forms a tight circular but overlapped band on the workpiece. It is particularly important to form the metal clip in a substantially uniform helix, or "circular profile" or "circular form" as will be described subsequently, on the workpiece in order to prevent leakage or slippage of the workpiece from the clip.

The Velarde application discloses a multipart die which includes a base member for engaging the crown or shoulder of a clip and spaced swinging arms which engage the legs or tips of a clip. These members move uniformly to shape the clip in a circular form about the workpiece.

While such a die assembly works in a satisfactory manner, an improved clip forming die has been sought which will achieve more uniform and consistent control of the formation of the clip. These efforts resulted in the development of the present invention.

SUMMARY OF THE INVENTION

Briefly, the present invention of a multipart die is comprised of a number of separate die members, each of which defines a sector of a circle and each of which is movable toward and away from a centerpoint of that circle. A clip engaging channel is defined in the engraving surface of each reciprocal die member. Two die members are adapted to engage the shoulders of the clip and the other die member is adapted to engage the opposite end legs of the clip simultaneously to deform the clip into a helix, or generally circular and overlapped form. In one embodiment of the invention, the clip engaging channel defines a circular form that is concentric with the centerpoint toward which the separate die members move during affixation of the metal clip. In another embodiment, the center of the circular form defined by the clip engaging channel is offset with respect to the die members' centerpoint of movement.

Thus, it is an object of the invention to provide an improved multipart die for forming a metal clip into a circular but overlapped member.

Another object of the present invention is to provide an improved multipart die comprised of at least three die members, each member defining a sector of a circle and the members collectively defining a single circle.

Still a further object of the present invention is to provide an improved multipart die which more efficiently and effectively produces and forms a metal clip into a circular and overlapped form about a workpiece.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 1 is a cross-sectional top view of the housing of a multipart die according to the present invention;

FIG. 2 is a cross-sectional top view of a clip used in combination with the multipart die of this invention;

FIG. 3 is a side view of the clip shown in FIG. 2;

FIG. 4 is a cross-sectional top view of the multipart die in the open or expanded position;

FIG. 5 is a perspective view of a die member's engaging surface;

FIG. 5A is a perspective view of the die member engaging surface cooperative with two die members of the type shown in FIG. 5;

FIG. 6 is a cross-sectional top view of the multipart die, shown in FIG. 4, in the closed circle position; and FIG. 7 is a cross-sectional top view of an alternative embodiment of the multipart die of the present invention, wherein the clip channel circle center is offset with respect to the die members' movement center.

DETAILED DESCRIPTION OF THE INVENTION

Referring initially to FIG. 4, the multipart die apparatus 10 of this invention includes a housing 12, block members 14, 16 and 18, die members 20, 22 and 24, a driving wedge 26, a driving yoke 28 and two driving pistons 30 and 32. All of the parts of this apparatus are preferably manufactured of a hard, durable metal, such that the apparatus will provide a long useful life under rigorous working conditions.

The housing 12 comprises a substantially hollow block having an open rectangular interior 34. The housing 12 includes two openings, 36 and 38, in the housing's wall 40 through which the driving pistons 30, 32 pass to engage and move the driving wedge 26 and the driving yoke 28, as will be explained shortly.

Referring to FIG. 1, the block members 14, 16 and 18 are positioned within the interior 34 to define three die passages 42, 44 and 46, and a central, circular area 48 therebetween. Each of the die passages 42, 44, 46 has an axis 50, 52, 54, respectively, which passes through the center 56 of the circle 48, forming a radius thereof. Each axis or radii is separated from the other radii by 120 degrees so that the die passages 42, 44, 46 project radially and symmetrically outward from the center 56.

Referring again to FIG. 4, one of the die members 20, 22, 24 is positioned within each of the die passages 42, 44, 46, respectively. The die members 20, 22, 24 abut the adjacent block members 14, 16, 18 defining the respective die passages 42, 44, 46 and are translatable within the die passages 42, 44, 46 in a radial direction toward and away from the center 56 of circle 48. Center 56 thus defines the die members' center of movement.

Each die member 20, 22, 24 has a first end or engaging surface 58, 60, 62, respectively, facing toward circle 48 and a second end 64, 66, 68 respectively, substantially opposite the engaging surface. Referring specifically to die member 20, as shown in FIG. 5, the first end 58 preferably includes an arcuate face segment 70 defining a sector of a circle. The engaging surface 58 also includes a clip channel 72 which is carved or formed into the arcuate face segment 70 and defines a sector of a continuous clip channel that engages a clip member when the apparatus 10 is in operation. The second end 64 of the die member 20, as shown best in FIG. 4, includes an inclined surface 74 that faces away from the center 56 of circle area 48.

The driving yoke 28 fits inside the housing 12, around the first block member 14, with the first and second die members 20, 22 in the center of the yoke 28 and the housing walls 40 on the outside of the yoke 28. The yoke has surfaces 76, 78 adjacent the second ends 64, 66 of die members 20, 22, respectively, which are inclined toward and away from center 56 of circle 48. Similarly the driving wedge 26 fits under the second and third block member, between the die member 24 and the housing 12, and has an inclined surface 80 adjacent second end 68 of die member 24.

The driving pistons 30, 32 project through openings 36, 38, respectively, and are secured to the wedge 26 and yoke 28. Operation of the pistons 30, 32 produces reciprocal movement of the wedge 26 and yoke 28 within the housing 12, causing the die members 20, 22, 24 to slide across the inclined surfaces 76, 78 and 80, respectively. As a result, the die members 20, 22, 24 are reciprocally translated within the die channels 42, 44, 46 between an open, or expanded, position and a closed circle position.

In the expanded position, as shown in FIG. 4, the drive pistons 30, 32, the wedge 26 and yoke 28 are retracted. The die members 20, 22, 24 are positioned on the lowest part of the inclined surfaces 76, 78, 80, withdrawn or translated radially away from the center 56 of the circle 48 to the greatest degree.

In operating the apparatus beginning from this position, a metal clip 82, such as shown in FIG. 2, is inserted into the central circular area 48 around a work piece (not shown) with the legs or tips 86 and 88 of the clip 82 adjacent die member 24, and the crown or shoulder 84 of the clip 82 adjacent die members 20, 22. The pistons 30, 32 then drive the wedge 26 and yoke 28, causing the die members 20, 22, 24 to translate radially toward the center 56 of circle 58. As the die members 20, 22, 24 close, surfaces 58, 60, 62 engage the clip member 82, positioning it in the clip channel 72 and clamping it onto the work piece in the circular form of the clip channel 72.

When the drive pistons 30, 32 are fully extended, the apparatus 10 is in the closed circle position, shown in FIG. 6. In preferred form, the die members lie along radii of the center circular area 48 and are separated from one another by about 120°. The first ends or engaging surfaces 58, 60, 62 meet or abut one another in the closed circle position, each arcuate segment defining a sector of a central circle that is concentric with the circle 48. Thus, the die members' direction of movement is radially aligned with not only circle 48, but also their respective engaging surfaces. In preferred form, the die member 24 defines more than 120° of the circle, enough more to allow adequate contact between the engaging surface 58 i.e. channels 72A, 72B and the clip legs 86, 88 when the die member 24 is closing from the open position.

The clip channels formed in the arcuate face segments of the die members' engaging surfaces define a continuous clip channel when the apparatus is in the closed circle position. The continuous clip channel defines a helix having a substantially circular profile when seen from a top view. Thus channel 72 in die member 20 and die member 22, and channels 72A, 72B in die member 24 in FIG. 5A define a helix path for clip 82. In one particularly preferred form, as shown in FIGS. 4 and 6, the circular profile is concentric with a circle defined by the die members' engaging surfaces 58, 60, 62. Stated another way, the center of the circular profile is coincident with the intersection 56 of radii defining the direction of the die members' movement within the die passages 42, 44, 46.

In another embodiment, shown in FIG. 7, the center 56 of the circular profile 58, 60, 62 defined by the close clip 82 is offset with respect to the center or intersection 59 of the central axes defining the die members' direction of movement. In this embodiment, the circular profile is offset with respect to the die member's center of intersection 59 in a direction, preferably toward the space between the clip's legs 86, 88.

As operation of the apparatus 10 continues from the closed circle position back to the expanded position, the pistons 30, 32 are retracted, allowing the wedge 26 and yoke 28 to retract, and the die members 20, 22, 24 to translate radially away from the center 56 of circular area 48. The workpiece, with clip 82 attached, is removed from the apparatus 10 so that a new workpiece and clip member can be inserted and the process begin again.

In preferred form, the apparatus 10 includes a device for controlling the timing and rate of movement of the pistons 26, 28 so that die members 20, 22, 24 are translated simultaneously between the expanded position and the closed circle. position. Similarly, the preferred embodiment of the invention includes a spring mechanism which causes the die members 20, 22, 24 to translate away from the center 56 of circular area 48 when the pistons 30, 32 and associated wedge 26 and yoke 28 are retracted.

It should be understood that the foregoing description relates to a preferred embodiment of the invention and that alternative embodiments and modifications are possible without departing from the true scope and spirit of the invention. For example, the invention may be made utilizing more than three die members. The block member may be cast from a single piece or made utilizing more than the three pieces 14, 16, 18 shown in the preferred embodiment. The first ends of the die members may be made square, rather than arcuate, with the clip channel formed more deeply into the face segment. Therefore, the scope of this invention is to be limited only by the following claims and their equivalents.

What is claimed is:

1. In apparatus for attaching a metal clip to a workpiece, the improvement comprising, in combination:

a multipart die for forming the clip into a substantially fixed diameter, helical configuration on the workpiece, said die including more than two die members, each of the die members having an arcuate face segment opposed to the workpiece, each die member being translatable only in a radial direction toward and away from the center of a circle surrounding the workpiece, said center being intermediate all of the die members, each of the face segments of said die members including a segment of a circular clip channel, said channel being continuous when the die members are in the closed position, with the face segments forming a closed surface about the workpiece; and means for simultaneously translating the die members in the radial direction only between an open position for positioning a metal clip between the die members on the workpiece and closed circle position for forming the metal clip into a circular configuration on the workpiece, said means including separate die passages for each die member, each die passage forming a radial passage for sliding movement of the associated die member.

2. The improvement of claim 1 wherein center of said circle coincides with the center of a circular profile defined by the clip channel.

3. The improvement of claim 1 wherein center of said circle is offset with respect to an intersection of central axes defining the die members direction of movement.

4. The improvement of claim 1 including three separate die members and associated die passages, each one of said die members being positioned for reciprocal movement along a radius of the circle each radius separated 120° from the radius of the other die member.

5. The improvement of claim 1 wherein said die is comprised of die members defining substantially equal sectors of a circle.

* * * * *